(12) United States Patent
MacAllister

(10) Patent No.: US 9,099,848 B2
(45) Date of Patent: Aug. 4, 2015

(54) BREAKAWAY COUPLER FOR WIRE SEGMENTS

(71) Applicant: Robert S. MacAllister, Pembrooke, ME (US)

(72) Inventor: Robert S. MacAllister, Pembrooke, ME (US)

( * ) Notice: Subject to any disclaimer, the term of this patent is extended or adjusted under 35 U.S.C. 154(b) by 227 days.

(21) Appl. No.: 13/966,016

(22) Filed: Aug. 13, 2013

(65) Prior Publication Data

US 2015/0050822 A1   Feb. 19, 2015

(51) Int. Cl.
| | |
|---|---|
| *H01R 13/635* | (2006.01) |
| *H01R 13/585* | (2006.01) |
| *H02G 7/04* | (2006.01) |
| *F16B 31/02* | (2006.01) |
| *H02G 15/007* | (2006.01) |

(52) U.S. Cl.
CPC ................ *H02G 7/04* (2013.01); *F16B 31/025* (2013.01); *H02G 15/007* (2013.01)

(58) Field of Classification Search
CPC ........ H02G 7/04; H02G 15/007; F16B 31/025
USPC ... 174/40 TD, 44, 84 R, 84 S, 86, 88 R, 88 S, 174/92, 93; 439/153, 154
See application file for complete search history.

(56) References Cited

U.S. PATENT DOCUMENTS

| | | | |
|---|---|---|---|
| 2,499,709 A | 4/1946 | Whitman et al. | |
| 3,205,300 A * | 9/1965 | Becker | 174/84 S |
| 4,163,599 A * | 8/1979 | Plugge et al. | 439/201 |
| 5,315,064 A * | 5/1994 | Andrews | 174/40 TD |
| 6,245,991 B1 | 6/2001 | Ryan | |
| 6,382,583 B1 | 5/2002 | Hill, III et al. | |
| 7,164,079 B2 * | 1/2007 | Zahnen et al. | 174/44 |
| 7,392,585 B2 * | 7/2008 | Ostendorp | 29/857 |
| 2010/0239129 A1 * | 9/2010 | Abe | 382/115 |

* cited by examiner

*Primary Examiner* — William H Mayo, III
*Assistant Examiner* — Hiram E Gonzalez
(74) *Attorney, Agent, or Firm* — Anthony D. Pellegrini

(57) ABSTRACT

A breakaway coupler suitable for connecting segments of powered and nonpowered wires, configured to provide a "weakest link" connection point that is the first to fail upon the application of a substantial force to the wire segments connected by the coupler. The couple including a first receptacle configured to securely retain a first segment of wire, a second receptacle configured to securely retain a second segment of wire, and a sacrificial coupling member configured to connect the first receptacle to the second receptacle.

20 Claims, 6 Drawing Sheets

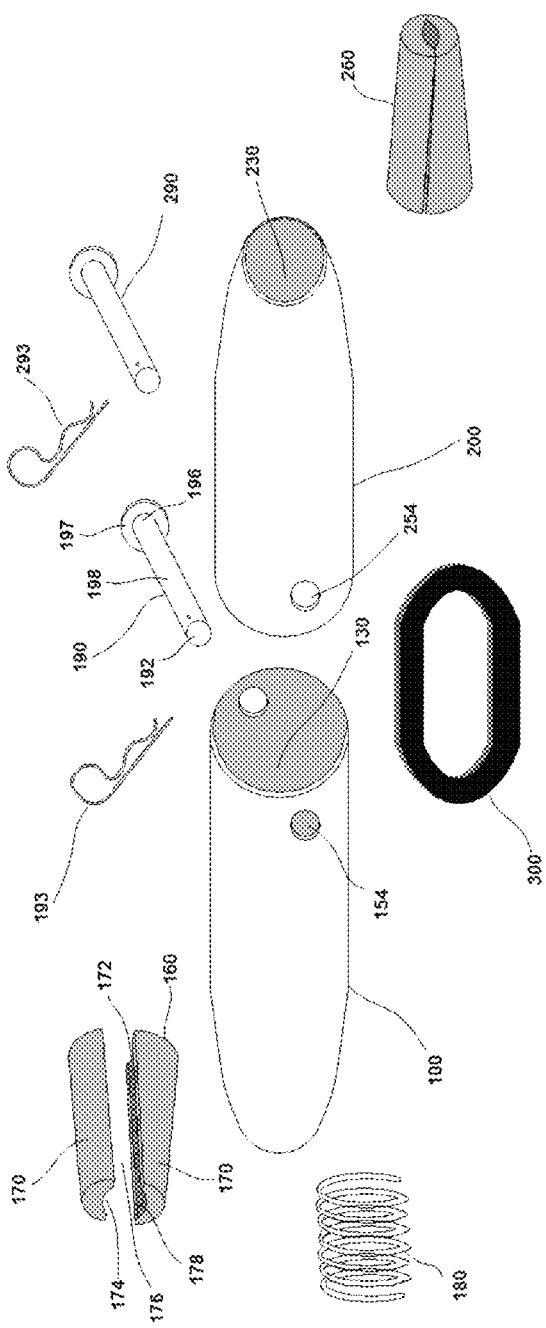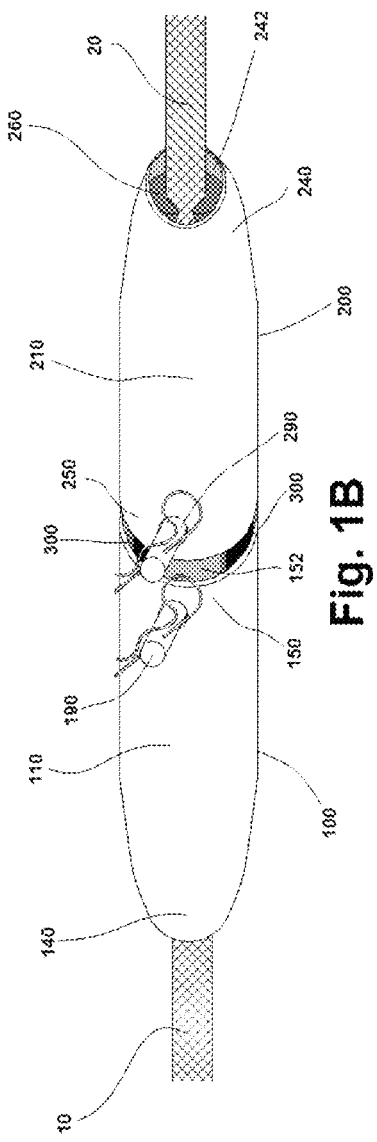
Fig. 1A
Fig. 1B

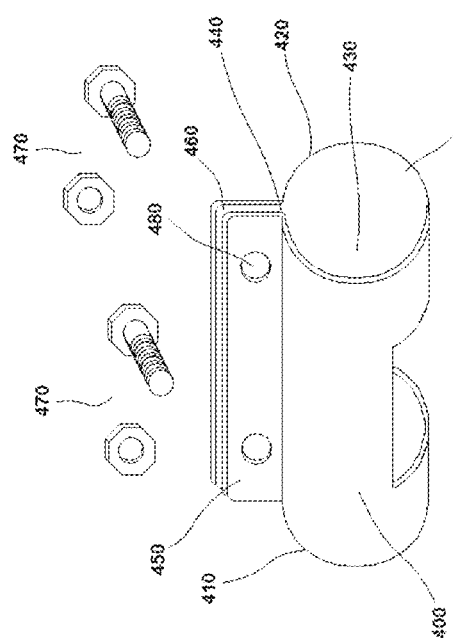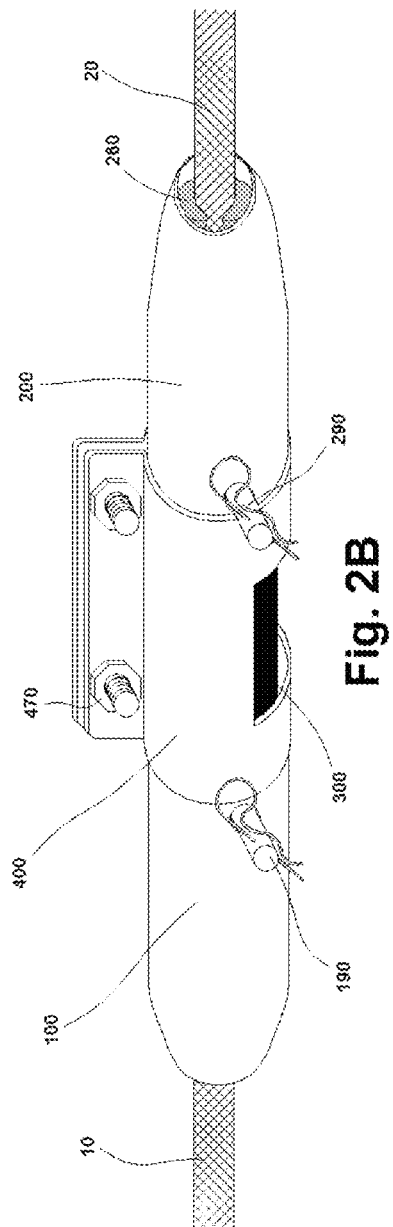

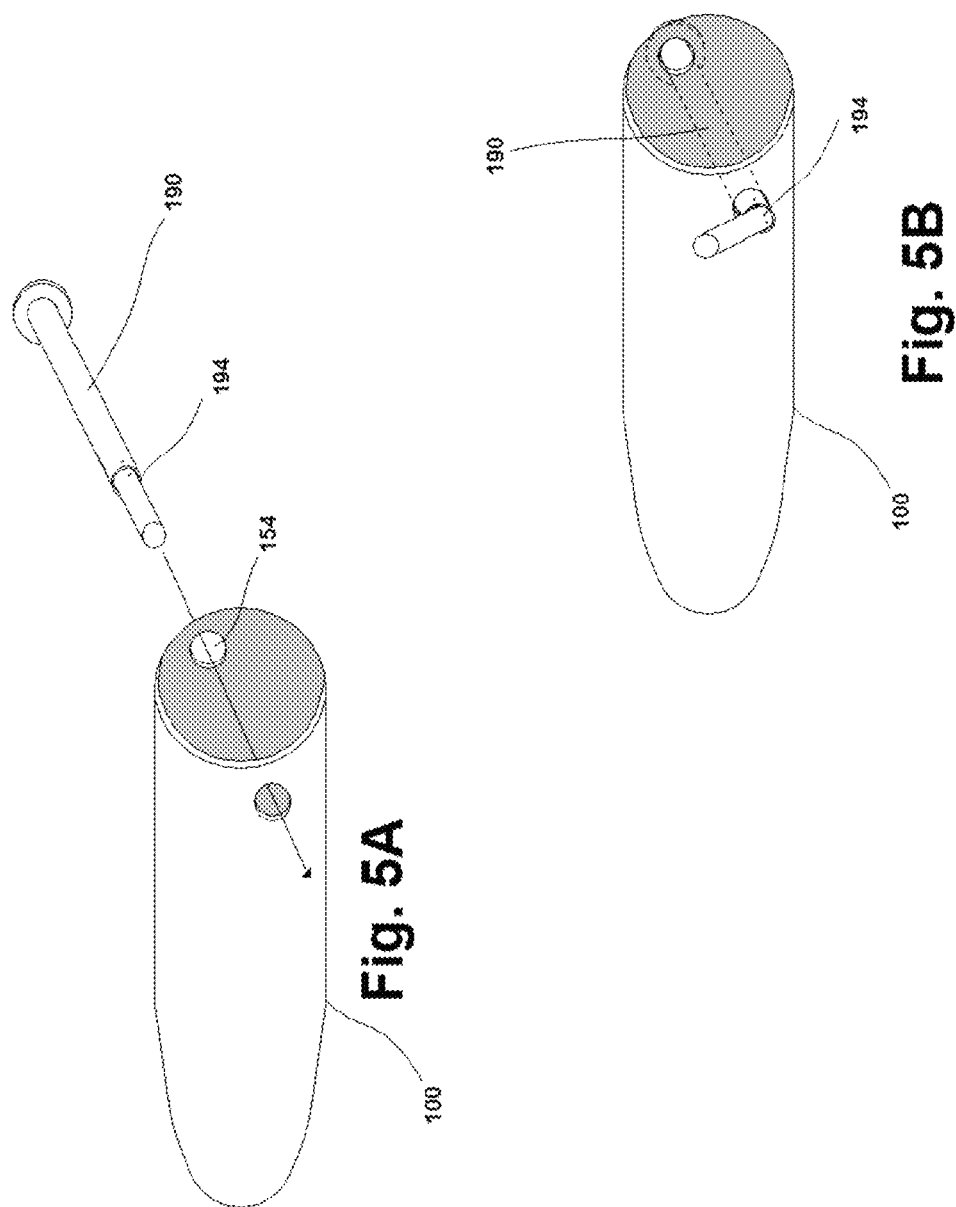

BREAKAWAY COUPLER FOR WIRE SEGMENTS

BACKGROUND OF THE INVENTION

1. Technical Field

The present invention relates generally to couplers for wires. More particularly, the present invention relates to a breakaway coupler suitable for connecting segments of powered and nonpowered wires. The coupler is configured to provide a "weakest link" connection point that is the first to fail upon the application of a substantial force to the wire segments connected by the coupler. Use of the coupler thus minimizes breakage of the wire segments or the structures from which they are suspended.

2. Description of Prior Art

Wood and steel utility poles are consistently brought to the ground by destructive forces such as falling trees, ice buildup, and the effects of high winds, with falling trees being the predominant culprit of broken poles. As trees fall onto wires strung between utility poles, shearing forces congregate towards the bases of the utility poles. The leverage of one large tree is often enough to break two poles, or more. For 150 years or so, the phone and power utilities have focused attention to larger utility poles, larger bolts, and larger diameter wires. All of the industries' attention has been on static strength, yet failure consistently occurs. The practice of stringing multiple wires between utility poles exacerbates this problem. A falling tree that catches on multiple wires strung between utility poles will have its weight distributed across the multiple wires, which will then be far less likely to break. However, the total force remains aggregated on the utility poles, and when the weight of the tree exceeds the breaking strength of the poles, though not of the wires or the connections between the wires and the poles, the poles break. Often there is a domino effect of many poles being broken in a row. Downed utility poles can have a devastating effect on the electrical infrastructure of a power grid. It is far more difficult, costly, and time consuming to replace a utility pole than a broken wire. If the energy of trees and ice and other forces could be passed through breakaway devices placed on the wires, the security and dependability of the poles as well as rapid grid recovery would be enhanced. Even if some wires are not fitted with breakaway couplers, if the majority of the wires strung between utility poles are fitted with breakaway couplers the remaining few wires would be unable to resist the destructive forces and would break, thereby sparing the utility poles.

There are presently known in the art various configurations of breakaway devices that enable the destructive force of a falling tree or ice to cause wires to separate, sparing the utility poles. However, these are complicated devices, requiring substantial installation time, and are costly to purchase and install. They are therefore not conducive to being prophylactically installed on all wires in a system. What is therefore needed is a breakaway coupler device for wires that is easy and quick to use and inexpensive.

It is thus an object of the present invention to present a breakaway coupler that connects two lengths of wire, and which has a breakaway strength less than the breakaway strength of either length of wire or the structures to which they are connected.

It is a further object of the present invention to present a breakaway coupler that is easy to use.

It is yet a further object of the present invention to present a breakaway coupler that can be installed quickly.

It is yet a further object of the present invention to present a breakaway coupler that is inexpensive to manufacture.

It is yet a further object of the present invention to present a breakaway coupler that is suitable for prophylactic installation across an entire grid.

Other objects of the present invention will be readily apparent from the description that follows.

SUMMARY OF THE INVENTION

The present invention discloses a breakaway coupler that is installed inline between the ends of two wire segments suspended from structures, such as utility poles or buildings. The wire segments may be powered lines, such as electrical transmission lines or phone lines, or unpowered lines such as messenger lines or guy wires or the like. The breakaway coupler is designed to come apart when a sufficient force is placed on it and/or either of the two wire segments attached to it, such as from a falling tree. This minimizes that risk that the wire segments or the structures to which the wire segments are attached will be broken when a sufficient force is applied to one or both wire segments.

The breakaway coupler of the present invention comprises a first receptacle, which is substantially cylindrical, hollow, and tapered, with openings at each end, a second receptacle, which is configured substantially the same as the first receptacle, and a coupling member joining the first receptacle to the second receptacle. The first receptacle is adapted to securely retain the end of one wire segment and the second receptacle is adapted to securely retain the end of the other wire segment. The coupling member is sacrificial, configured to fail upon the application of a disconnecting force upon it. The disconnecting force necessary to break the coupling member is less than the force needed to separate the wire segments from the first and second receptacles, less than the force needed to break either of the two wire segments, and less than the force needed to break the utility poles from which the wire segments are suspended. Thus, the coupler represents the "weak link" in the configuration and allows for the early separation of the first and second receptacles.

The present invention further discloses various configuration of the components of the breakaway coupler, including different means for securing the wire segments to the receptacles and for attaching the receptacles to each other. It also discloses different configurations of the sacrificial coupling member.

It is to be understood that the foregoing and following description of the invention is intended to be illustrative and exemplary rather than restrictive of the invention as claimed. These and other aspects, advantages, and features of the invention will become apparent to those skilled in the art after review of the entire specification, accompanying figures, and claims incorporated herein.

BRIEF DESCRIPTION OF THE DRAWINGS

FIG. 1A is an exploded perspective view of one embodiment of the present invention.

FIG. 1B is a perspective view of the embodiment of the present invention depicted in FIG. 1A, assembled and in use.

FIG. 2A is a perspective view of the conductive collar component of another embodiment of the present invention.

FIG. 2B is a perspective view of the embodiment of the present invention depicted in FIG. 2A, assembled and in use.

FIG. 5A is a perspective view of an embodiment of the present invention comprising an anchor member having a hinged retaining device, with the hinged retaining device in insertion mode ready for deployment into the receptacle of the coupler.

FIG. 5B is a perspective view of the embodiment of the present invention depicted in FIG. 5A with the hinged retaining device inserted into the receptacle of the coupler and manipulated to securing mode.

DETAILED DESCRIPTION OF THE INVENTION

Figure 6A:
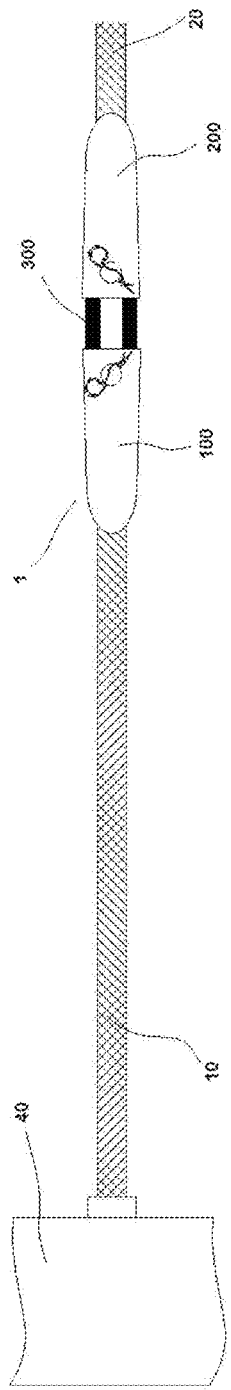
FIG. 6A is a schematic view of an embodiment of the present invention in use.
Figure 6B:
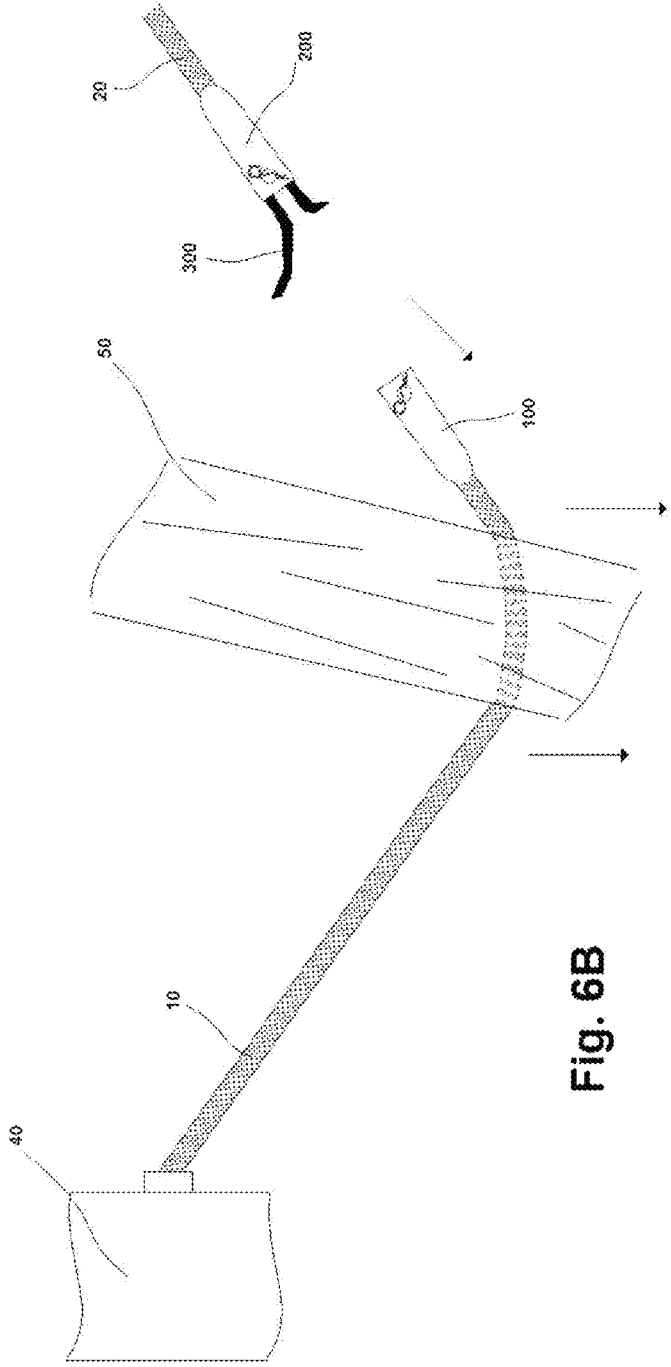
FIG. 6B is a schematic view of the embodiment of the present invention depicted in FIG. 6A, showing a tree falling onto a wire and the sacrificial coupling member breaking to allow the first and second receptacles of the coupler to separate, thereby relieving the force on the structure to which to wire is attached.

The breakaway coupler 1 of the present invention comprises a first receptacle 100, a second receptacle 200, and a coupling member 300. See FIG. 1B. The first and second receptacles 100,200 are each configured to removably attach to the respective ends of the two separate wire segments 10,20, and the coupling member 300 connects the first receptacle 100 to the second receptacle 200. The coupling member 300 is sacrificial, configured to fail upon the application of a sufficient disconnecting force upon it, such as from a falling tree 50 landing on one or more wire segments 10,20, resulting in the first receptacle 100 and the second receptacle 200 being separated from each other. See FIG. 6B. The coupling member 300 may be configured to withstand varying levels of force, dependent upon the configuration of the wire segments 10,20 and structures 40. For example, a coupling member 300 used in a breakaway coupler 1 to connect heavier wire segments 10,20 will have to withstand a greater force before failing, to account for the greater weight of the wire segments 10,20. Similarly, a coupling member 300 used in a breakaway coupler 1 to connect wire segments 10,20 to smaller utility poles will have to fail upon being subjected to a lesser force, to prevent the smaller utility poles from breaking.

The first receptacle 100 of the breakaway coupler 1 is elongated and has an outer surface 110 defining a substantially hollow interior space 130. The first receptacle 100 has a first wire retaining end 140 and a first coupling end 150 located opposite the first wire retaining end 140. The first receptacle 100 may have any suitable shape and size. In the preferred embodiments the first receptacle 100 is substantially cylindrical in shape. In the most preferred embodiments the cylindrical shape of the first receptacle 100 terminates at the first wire retaining end 140 in a taper, with the opening 142 at the first wire retaining end 140 having a smaller inside diameter than the inside diameter of the first receptacle 100 at its midpoint. See FIG. 1A. The first coupling end 150 of the first receptacle 100 will have an opening 152 with an inside diameter that is substantially the same as the inside diameter of the first receptacle 100 at its midpoint, or slightly larger. In some embodiments the inside diameter of the opening 152 of the first coupling end 150 of the first receptacle 100 may be slightly smaller than the inside diameter of the first receptacle 100 at its midpoint. The largest inside diameter of the first receptacle 100 will be between one half inch and four inches, and the smallest inside diameter of the first receptacle 100 will be between an eighth of an inch and three inches. The length of the first receptacle 100, from the first wire retaining end 140 to the first coupling end 150, will be between two inches and twenty-four inches. The first receptacle 100 may be made of any suitable material, as long as it is substantially rigid, durable, and resistant to environmental degradation. The first receptacle 100 may be made of metals, such as aluminum, copper, stainless steel, and the like, alloys, composites, polymers, and other materials. Where the coupler 1 is to be used to connect electrically conducting wire segments 10,20, the material that the first receptacle 100 is made from must be electrically conductive. In the preferred embodiments the first receptacle 100 is made of aluminum.

The first wire retaining end 140 of the first receptacle 100 has a first wire retaining aperture 142 which allows access into the substantially hollow interior space 130 of the first receptacle 100. The first wire retaining aperture 142 is configured to allow the insertion end 12 of the first wire segment 10 to be inserted at least partially into the substantially hollow interior space 130 of the first receptacle 100. In the preferred embodiments the first wire retaining aperture 142 is round, though in other embodiments it may have an oval shape, or a polygonal shape, or even an irregular shape. In the most preferred embodiments the inside diameter of the first wire retaining aperture 142 is slightly larger than the outside diameter of the insertion end 12 of the first wire segment 10.

The first receptacle 100 further comprises a first wire retaining member 160 and a first anchor member 190. See FIG. 1A. The first wire retaining member 160 is located within the substantially hollow interior space 130 of the first receptacle 100 at the first wire retaining end 140. It is configured to retain the insertion end 12 of the first wire segment 10 within the first receptacle 100. The first anchor member 190 is located at the first coupling end 150 of the first receptacle 100. It provides a point of connection for the coupling member 300 to connect to the first receptacle 100.

The second receptacle 200 is configured substantially identically to the first receptacle 100, in size, shape, material of construction, and components. It thus also has an outer surface 210 defining a substantially hollow interior space 230, a second wire retaining end 240, a second wire retaining aperture 242, a second coupling end 250, a second wire retaining member 260, and a second anchor member 290. These elements and components are configured substantially identically to those of the first receptacle 100 and perform the same functions (although in the case of the second wire retaining member 260 it is configured to retain the insertion end 22 of the second wire segment 20 within the second receptacle 200, and in the case of the second anchor member 290 it is configured to provide a point of connection for the coupling member 300 to connect to the second receptacle 200).

The sacrificial coupling member 300 is configured to be connected to the first anchor member 190 of the first receptacle 100 and to the second anchor member 290 of the second receptacle 200. When so connected, the first receptacle 100 and the second receptacle 200 are attached to each other. As explained previously, the coupling member 300 is configured to release from at least one of the first anchor member 190 and the second anchor member 290 when a disconnecting force is exerted on it. This may occur by the coupling member 300 breaking, if it is made of a non-deformable material, or by the coupling member 300 deforming its shape, if it is made of a deformable material. In different embodiments the amount of force needed to cause the coupling member 300 to release from either or both of the first and second receptacles 100,200 can be varied by changing one or more of the shape, dimensions, and materials from which the coupling member 300 is made. The breaking strength of the coupling member 300 should be calculated as a function of the breaking strength of the wire segments 10,20 to be joined by the coupler 1, the length of the wire segments 10,20 (and thus their weight), and the strength of the attachment points of the wire segments 10,20 to their supporting structures 40. See FIG. 6A.

The coupling member 300 may be of any suitable shape. The coupling member 300 must be able to remain connected to the first and second anchor members 190,290 of the first and second receptacles 100,200, respectively, until a disconnecting force is applied to it. It may be shaped as a closed ring, a partially opened ring, a double ended member having a closed ring at each end, a doubled ended member having partially opened rings at each end, a double ended member having one closed ring at one end and one partially opened ring at the other end, or any other suitable shape. See FIGS. 4A-4E. The rings may be circular, ovoid, polygonal, or irregularly shaped. The partially opened rings may take the form of hooks. In the preferred embodiments the coupling member 300 is a closed ring. In the most preferred embodiments the coupling member 300 has an ovoid shape. The coupling member 300 may be made of any suitable material, as long as it is durable and resistant to environmental degradation. The coupling member 300 may be made of metals, such as aluminum, copper, stainless steel, and the like, alloys, composites, polymers, and other materials. The coupling member 300 may be substantially rigid, or it may be substantially flexible, constructed out of wire, cable, chain links, rubber, or the like. In the preferred embodiment the coupling member 300 is constructed of aluminum.

In some embodiments of the present invention the breakaway coupler 1 is electrically conductive. That is, electricity is capable of flowing from the first wire segment 10 to the second wire segment 20 through the breakaway coupler 1, and vice versa. In such embodiments a minimum number of components of the breakaway coupler 1 must also be electrically conductive. In a preferred embodiment, the first receptacle 100 is electrically conductive, the first wire retaining member 160 is electrically conductive, the first anchor member 190 is electrically conductive, the second receptacle 200 is electrically conductive, the second wire retaining member 260 is electrically conductive, the second anchor member 290 is electrically conductive, and the coupling member 300 is electrically conductive. The first wire segment 10 is in contact with the first wire retaining member 160, which is in contact with the first receptacle 100, which is in contact with the first anchor member 190, which is in contact with the coupling member 300, which is in contact with the second anchor member 290, which is in contact with the second receptacle 200, which is in contact with the second wire retaining member 260, which is in contact with the second wire segment 20. There is thus an unbroken connection of electrically conductive components between the first wire segment 10 and the second wire segment 20, allowing an electric current to pass between the wire segments 10,20.

In other embodiments where the breakaway coupler 1 is electrically conductive, the breakaway coupler 1 further comprises a conductive collar 400. See FIG. 2A. The conductive collar 400 is made from an electrically conductive material, such as aluminum or steel. The conductive collar 400 has a first end 410 and a second end 420. The first end 410 of the conductive collar 400 is suitably configured to engage with the outer surface 110 of the first receptacle 100 proximate to the first coupling end 150 of the first receptacle 100. The second end 420 of the conductive collar 400 is suitably configured to engage with the outer surface 210 of the second receptacle 200 proximate to the second coupling end 250 of the second receptacle 200. See FIG. 2B. In this configuration, the conductive collar 400 is electrically conductive, the first receptacle 100 is electrically conductive, the first wire retaining member 160 is electrically conductive, the second receptacle 200 is electrically conductive, and the second wire retaining member 260 is electrically conductive. There is no need for the first anchor member 190, the second anchor member 290, or the coupling member 300 to be electrically conductive (though they may be electrically conductive, if desired). The first wire segment 10 is in contact with the first wire retaining member 160, which is in contact with the first receptacle 100, which is in contact with the conductive collar 400, which is in contact with the second receptacle 200, which is in contact with the second wire retaining member 260, which is in contact with the second wire segment 20. There is thus an unbroken connection of electrically conductive components between the first wire segment 10 and the second wire segment 20, allowing an electric current to pass between the wire segments 10,20.

In the preferred embodiments where a conductive collar 400 is used, the conductive collar 400 is substantially cylindrical, as are the first receptacle 100 and the second receptacle 200. The conductive collar 400 has a first opening proximate to its first end 410 with an inside diameter which is substantially the same as the first outer diameter of the first receptacle 100 proximate to the first coupling end 150 of the first receptacle 100. The conductive collar 400 has a second opening 422 proximate to its second end 420 with an inside diameter which is substantially the same as the second outer diameter of the second receptacle 200 proximate to the second coupling end 250 of the second receptacle 200. So configured, the conductive collar 400 is placed over the first coupling end 150 of the first receptacle 100 and over the second coupling end 250 of the second receptacle 200, such that that first and second coupling ends 150,250 of the first and second receptacles 100,200 are positioned within the substantially hollow interior space 430 of the conductive collar 400. See FIG. 2B. To facilitate installation of the conductive collar 400, the conductive collar 400 may be configured with a longitudinal slot 440 running from its first end 410 to its second end 420, oriented substantially parallel with the longitudinal axis of the conductive collar 400. If the conductive collar 400 is made of a deformable material, its longitudinal slot 440 may be forced open to allow for insertion of the first and second coupling ends 150,250 of the first and second receptacles 100,200 into the interior of the conductive collar 400, thereafter returning to its original shape. Alternatively, the conductive collar 400 may have a longitudinal hinge located opposite the longitudinal slot 440 and substantially parallel thereto, to facilitate the opening and closing of the conductive collar 400.

In the most preferred embodiments using the conductive collar 400, the conductive collar 400 has a longitudinal slot 440 as described above, as well as a first flange 450 and a second flange 460. The first flange 450 is substantially planar and extends outward from one side of the longitudinal slot 440, and the second flange 460 is substantially planar and extends outward from the other side of the longitudinal slot 440. The first and second flanges 450,460 are oriented substantially parallel to each other and may be slightly spaced apart from each other or in contact with each other. There may be one or more securing members 470 present, configured to secure the first flange 450 to the second flange 460. In one embodiment the first flange 450 of the conductive collar 400 has one or more flange apertures 480, each flange aperture 480 corresponding to a securing member 470. Similarly, the second flange 460 of the conductive collar 400 has one or more flange apertures 480, each flange aperture 480 corresponding to a securing member 470. Each flange aperture 480 of the first flange 450 is substantially aligned with a corresponding flange aperture 480 of the second flange 460. Each of the securing members 470 may be comprised of a threaded bolt and a threaded nut, with each bolt configured to pass through a flange aperture 480 of the first flange 450 and a corresponding flange aperture 480 of the second flange 460 and to be secured by a corresponding threaded nut being threaded onto the threaded bolt. Other configurations of the securing members 470 are also contemplated, for example, the securing members 470 could be cotter pins. Alternatively, the flange apertures 480 may be threaded and the threaded bolts are threaded into the flange apertures 480 without need for retaining nuts. So configured, the flanges 450,460 facilitate the opening of the longitudinal slot 440 to allow for insertion of the first and second coupling ends 150,250 of the first and second receptacles 100,200 into the conductive collar 400; thereafter, the securing members 470 tightly secure the conductive collar 400 to the first and second receptacles 100,200. Notwithstanding the secure fit of the conductive collar 400 to the first and second receptacles 100,200, however, the first and second receptacles 100,200 are capable of sliding out of the conductive collar 400 if the coupling member 300 releases due to a disconnecting force acting upon it. In yet other embodiments, the conductive collar 400 provides a tight enough fit to the first and second receptacles 100,200 so that a separate coupling member 300 and the first and second anchor members 190,290 are not required. Instead, the conductive collar 400 serves as the coupling member, holding together the first and second receptacles 100,200 until a sufficient force applied to the wire segments 10,20 causes either or both of the first and second receptacles 100,200 to slide out of the conductive collar 400.

In other embodiments, a non-conductive collar may be used, to increase the stability of the breakaway coupler 1. The non-conductive collar is configured the same as the conductive collar 400, with the exception that it is made of a non-conducting material. The non-conductive collar is intended for use where the wire segments 10,20 attached to the breakaway coupler 1 are not electrically conductive. (Of course, a conductive collar 400 may be used with a breakaway coupler 1 even if the wire segments 10,20 are not electrically conductive.) If the breakaway coupler 1 is intended to be used with electrically conducting wire segments 10,20, then if a non-conductive collar is used, the first anchor member 190, the second anchor member 290, and the coupling member 300 must be electrically conductive.

In some embodiments of the present invention, the first receptacle 100 comprises a pair of lateral circular apertures 154 located proximate to its first coupling end 150. See FIG. 1A. Each of these lateral circular apertures 154 passes through the outer surface 110 of the first receptacle 100 and provides access into the substantially hollow interior space 130 of the first receptacle 100. The lateral circular apertures 154 have substantially similar diameters and are oriented on opposite sides of the first receptacle 100 from each other, such that a straight line passing through their centers is oriented substantially perpendicular to the longitudinal axis of the first receptacle 100. In these embodiments, the first anchor member 190 is a substantially cylindrical rod having an outside diameter just slightly smaller than the diameter of each lateral circular aperture 154. The first anchor member 190 has a first end 192, a second end 196, and a middle portion 198 located between the first and second ends 192,196. The length of the first anchor member 190 from its first end 192 to its second end 196 is greater than the distance between the pair of lateral circular apertures 154. The first anchor member 190 is configured to be placed into and through the pair of lateral circular apertures 154 such that the first end 192 of the first anchor member 190 extends beyond the outer surface 110 of the first receptacle 100, the second end 196 of the first anchor member 190 extends beyond the outer surface 110 of the first receptacle 100, the middle portion 198 of the first anchor member 190 is located within the substantially hollow interior space 130 of the first receptacle 100, and the first anchor member 190 is oriented substantially perpendicular to a longitudinal axis of the first receptacle 100. The coupling member 300 is configured such that a portion of the coupling member 300 is capable of being inserted through the coupling end aperture 152 at the first coupling end 150 of the first receptacle 100 and into the substantially hollow interior space 130 of the first receptacle 100, wherein the coupling member 300 is placed in connection with the middle portion 198 of the first anchor member 190.

In preferred embodiments the first anchor member 190 is removably attached to the first receptacle 100. This enables use of a closed ring coupling member 300, as follows: the first anchor member 190 is removed from the first receptacle 100, a portion of the closed ring coupling member 300 is inserted into the coupling end aperture 152 of the first receptacle 100, then the first anchor member 190 is replaced into the first receptacle 100, with the middle portion 198 of the first anchor member 190 passing through the closed ring of the coupling member 300. In these embodiments the first end 192 of the first anchor member 190 comprises a first removable retaining device 193, such that when the first removable retaining device 193 is removed from the first end 192 of the first anchor member 190, the first end 192 of the first anchor member 190 is capable of passing through both of the lateral circular apertures 154 of the first receptacle 100. When the first removable retaining device 193 is engaged with the first end 192 of the first anchor member 190, the first end 192 of the first anchor member 190 cannot pass through either of the lateral circular apertures 154 of the first receptacle 100. In addition, the second end 196 of the first anchor member 190 may comprise a stop member 197. See FIG. 1A. The stop member 197 has a dimension larger than each of the diameters of the lateral circular apertures 154 of the first receptacle 100 such that the second end 196 of the first anchor member 190 cannot pass through either of the lateral circular apertures 154 of the first receptacle 100. The stop member 197 may be the head of a bolt. It may also be a threaded nut configured to be inserted onto threads formed onto the second end 196 of the first anchor member. Other configurations of the stop member 197 are also contemplated.

In some configurations the first removable retaining device 193 is a cotter pin configured to be inserted into an aperture formed through the first end 192 of the first anchor member 190. See FIG. 1A. In other configurations the first removable retaining device 193 is a threaded nut configured to be inserted onto threads formed onto the first end 192 of the first anchor member 190. In yet other configurations the first end 192 of the first anchor member 190 comprises a hinged retaining device 194. See FIGS. 5A-5B. The hinged retaining device 194 is capable of being aligned substantially along the longitudinal axis of the first anchor member 190 and being capable of being aligned substantially perpendicular to the longitudinal axis of the first anchor member 190. When the hinged retaining device 194 is aligned substantially along the longitudinal axis of the first anchor member 190, the first end 192 of the first anchor member 190 passes through both of the lateral circular apertures 154 of the first receptacle 100. See FIG. 5A. When the hinged retaining device 194 is aligned substantially perpendicular to the longitudinal axis of the first anchor member 190, the first end 192 of the first anchor member 190 cannot pass through either of the lateral circular apertures 154 of the first receptacle 100. See FIG. 5B. Other configurations of the first removable retaining device 193 are also contemplated by the present invention.

In alternative embodiments, the first anchor member 190 may be fixedly attached to the first receptacle 100. In such embodiments, the length of the first anchor member 190 is substantially the same as the inside diameter of the coupling end aperture 152 of the first receptacle 100. The first anchor member 190 is located within the substantially hollow interior space 130 of the first receptacle 100 proximate to the first coupling end 150 of the first receptacle 100, with the first end 192 of the first anchor member 190 fixedly attached to the inside surface of the first receptacle 100 and the second end 196 of the first anchor member 190 fixedly attached to the inside surface of the first receptacle 100. The attachment may be by any suitable means; in the preferred embodiment, the first anchor member 190 is welded to the first receptacle 100. Where a fixed first anchor member 190 is used, the coupling member 300 must have at least one opened ring configuration so as to be capable of being placed onto the middle portion 198 of the fixed first anchor member 190.

The second anchor member 290 is configured substantially identically to the first anchor member 190, in size, shape, material of construction, and means of integration. It thus also has a first end, a second end, and a middle portion, and may be removably attached to the second receptacle 200 through lateral circular apertures 254 or fixedly attached thereto. Where the second anchor member 290 is removably attached to the second receptacle 200, it comprises a second removable retaining device 293 configured substantially the same as the first removable retaining device 193 of the first anchor member 190. Where a fixed second anchor member 290 is used, the coupling member 300 must have at least one opened ring configuration so as to be capable of being placed onto the middle portion of the second anchor member 290.

Figure 3:
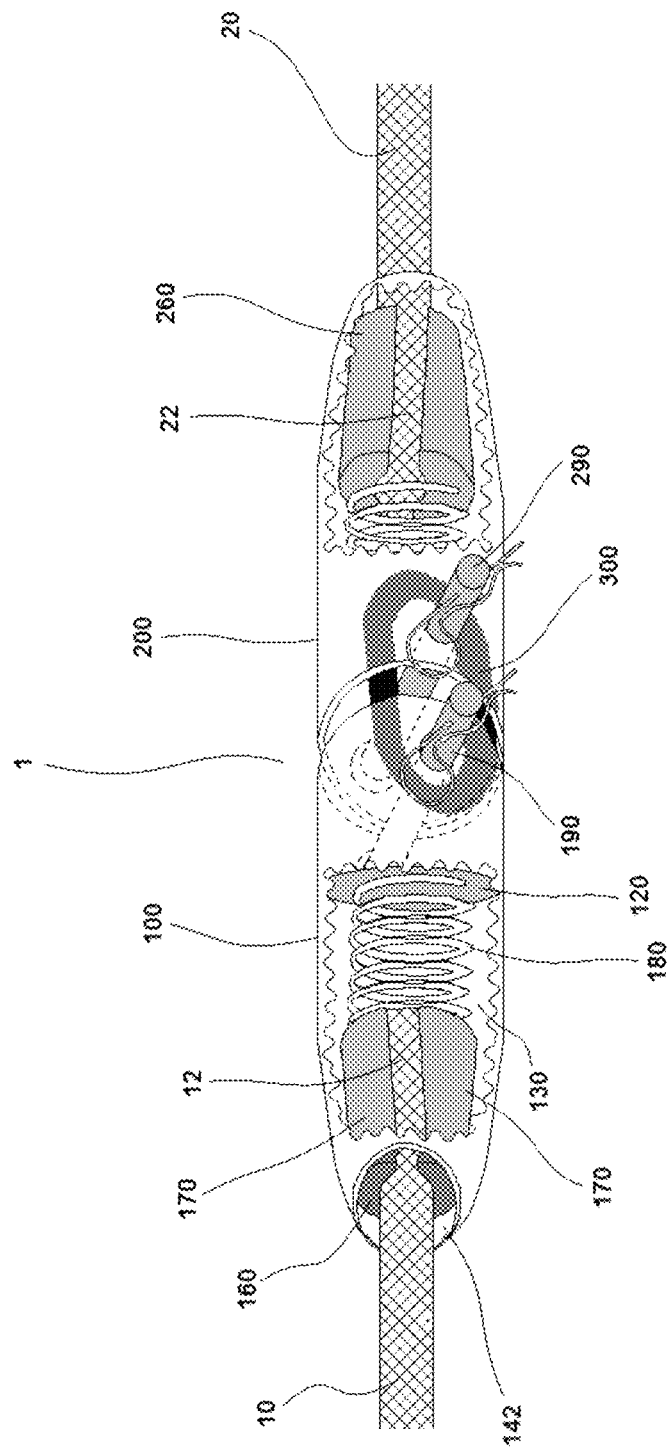
FIG. 3 is a perspective view of the embodiment of the present invention depicted in FIG. 1A, assembled and in use, with cutaways and ghost lines to show internal components.
Figure 4A:
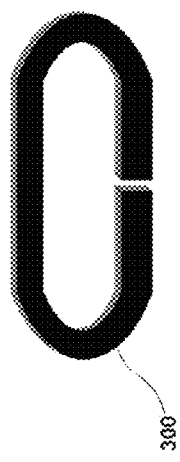
FIG. 4A is a perspective view of one embodiment of the sacrificial coupling member of the present invention.
Figure 4B:
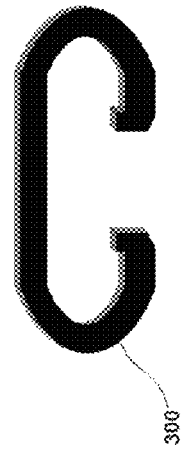
FIG. 4B is a perspective view of another embodiment of the sacrificial coupling member of the present invention, having two opened ends.
Figure 4C:
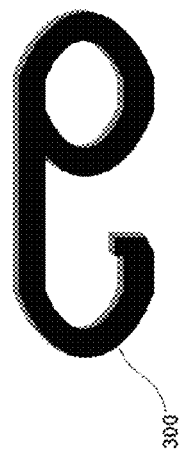
FIG. 4C is a perspective view of yet another embodiment of the sacrificial coupling member of the present invention, having one opened end and one closed end.
Figure 4D:
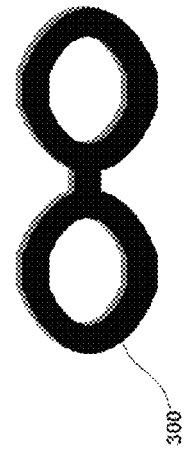
FIG. 4D is a perspective view of yet another embodiment of the sacrificial coupling member of the present invention, having two closed ends.
Figure 4E:
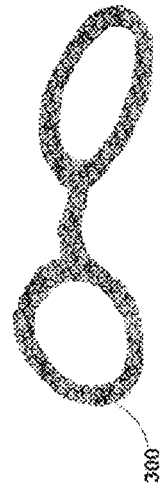
FIG. 4E is a perspective view of yet another embodiment of the sacrificial coupling member of the present invention, being made of a flexible material and having two closed ends.

The first wire retaining member 160 may be configured in any manner so long as it is capable of securely retaining an end 12 of the first wire segment 10 within the first receptacle 100. In one embodiment, where the first receptacle 100 is tapered at its first wire retaining end 140, the first wire retaining member 160 is comprised of a pair of mated jaws 170, which when brought together form a substantially frustoconical shape. See FIG. 1A. The first wire retaining member 160 has an outside diameter which is greater than the inner diameter of the first wire retaining aperture 142 and smaller than the inner diameter of the first receptacle 100. As such, the first wire retaining member 160 cannot pass through the first wire retaining aperture 142 of the first receptacle 100, but it can move freely within the substantially hollow interior space 130 of the first receptacle 100 outside of the taper at the first wire retaining end 140. When the first wire retaining member 160 is moved into the tapered end of the first receptacle 100 it becomes wedged therein. Each jaw of the mated pair of jaws 170 of the first wire retaining member 160 has an inner surface 172 and a substantially semi-cylindrical concave channel 174 inscribed within its inner surface 172. When the pair of jaws 170 are placed together their respective inner surfaces 172 face each other and the channels 174 define a substantially cylindrical passageway 176 through the first wire retaining member 160. This passageway 176 is configured to contain therein the end 12 of the first wire segment 10. The inner surfaces 172 of the mated jaws 170 further comprise a plurality of unidirectional gripping members 178 which allow the end 12 of the first wire segment 10 to move over the gripping members 178 in a direction away from the first wire retaining end 140 of the first receptacle 100 but which impede movement of the end 12 of the first wire segment 10 in a direction toward the first wire retaining end 140 of the first receptacle 100. See FIG. 3.

Thus, when the end 12 of the first wire segment 10 is inserted into the first receptacle 100, it moves into the passageway 176 defined by the pair of jaws 170 of the first wire retaining member 160, pushing the jaws 170 apart somewhat while moving over the gripping members 178 and pushing the first wire retaining member 160 away from the first wire retaining end 140 of the first receptacle 100. Then, the first wire segment 10 is pulled in the opposite direction. The gripping members 178 impede the wire segment's 10 movement within the passageway, thereby drawing the first wire retaining member 160 towards the tapered end of the first receptacle 100, which in turn forces the jaws 170 closer together, increasing their hold on the wire segment 10. In some embodiments the first wire retaining member 160 further comprises a biasing spring 180 to facilitate movement of the jaws 170 toward the tapered end. Where a biasing spring 180 is used, the first receptacle 100 further comprises an inside planar surface 120, where the inside planar surface 120 is located within the substantially hollow interior space 130 of the first receptacle 100 between the first wire retaining end 140 and the first coupling end 150, with the inside planar surface 120 being oriented substantially perpendicular to a longitudinal axis of the first receptacle 100. The biasing spring 180 is then located within the substantially hollow interior space 130 of the first receptacle 100 between the inside planar surface 120 and the first wire retaining member 160. The biasing spring 180 is biased to move the mated jaws 170 of the first wire retaining member 160 towards the first wire retaining end 140 of the first receptacle 100. This configuration of the first wire retaining member 160 allows for very easy use of the breakaway coupler 1. A user simply takes the end of a wire segment and inserts it as far as it can go into the first receptacle 100 through its first wire retaining aperture 142, then pulls on the wire segment until the first wire retaining member 160 is tightly wedged into the tapered end of the first receptacle 100. The breakaway coupler 1 can thus be installed onto a wire segment in seconds.

The second wire retaining member 260 of the second receptacle 200 is configured substantially identical to the first wire retaining member 160 of the first receptacle 100. The second receptacle 200 may also have an inside planar surface to accommodate a biasing spring. The second wire segment 20 is inserted into the second receptacle 200 in the same manner as described above.

Modifications and variations can be made to the disclosed embodiments of the present invention without departing from the subject or spirit of the invention as defined in the following claims.

I claim:

1. A coupler configured to provide a breakaway connection between two wire segments, with a first wire segment having an insertion end and a second wire segment having an insertion end, said coupler comprising:
   a first receptacle,
      said first receptacle being elongated and having an outer surface defining a substantially hollow interior space,
      said first receptacle having a first wire retaining end and a first coupling end located opposite said first wire retaining end,
      said first receptacle comprising a first wire retaining member and a first anchor member,
      said first wire retaining end having a first wire retaining aperture allowing access into the substantially hollow interior space of the first receptacle,
      said first wire retaining aperture configured to allow the insertion end of the first wire segment at least partially within the substantially hollow interior space of the first receptacle,
      said first wire retaining member being located within the substantially hollow interior space of the first receptacle proximate to the first wire retaining end,
      said first wire retaining member configured to retain the insertion end of the first wire segment to be inserted at least partially within the substantially hollow interior space of the first receptacle, and
      said first anchor member being located proximate to the first coupling end;
   a second receptacle,
      said second receptacle being elongated and having an outer surface defining a substantially hollow interior space,
      said second receptacle having a second wire retaining end and a second coupling end located opposite said second wire retaining end,
      said second receptacle comprising a second wire retaining member and a second anchor member,
      said second wire retaining end having a second wire retaining aperture allowing access into the substantially hollow interior space of the second receptacle,
      said second wire retaining aperture configured to allow the insertion end of the second wire segment to be inserted at least partially within the substantially hollow interior space of the second receptacle,
      said second wire retaining member being located within the substantially hollow interior space of the second receptacle proximate to the second wire retaining end,
      said second wire retaining member configured to retain the insertion end of the second wire segment at least partially within the substantially hollow interior space of the second receptacle, and
      said second anchor member being located proximate to the second coupling end; and
   a sacrificial coupling member,
      said coupling member configured to be connected to the first anchor member and to the second anchor member such that the first receptacle and the second receptacle are in connection with each other, and
      said coupling member further configured to release from at least one of the first anchor member and the second anchor member when a disconnecting force is exerted on said coupling member, resulting in the first receptacle and the second receptacle not being in connection with each other,
      wherein said disconnecting force is less than a first force, said first force being sufficient to cause the insertion end of the first wire segment to be withdrawn from the first wire retaining member,
      said disconnecting force is less than a second force, said second force being sufficient to cause the insertion end of the second wire segment to be withdrawn from the second wire retaining member,
      said disconnecting force is less than a third force, said third force being sufficient to cause the first wire segment to break, and
      said disconnecting force is less than a fourth force, said fourth force being sufficient to cause the second wire segment to break.

2. The coupler of claim 1 wherein
the first receptacle is electrically conductive,
the first wire retaining member is electrically conductive,
the first anchor member is electrically conductive,
the second receptacle is electrically conductive,
the second wire retaining member is electrically conductive,
the second anchor member is electrically conductive, and
the coupling member is electrically conductive.

3. The coupler of claim 1 wherein
the first receptacle is substantially cylindrical, having a coupling end aperture at its first coupling end allowing access into the substantially hollow interior space of the first receptacle,
the first receptacle further comprises a pair of lateral circular apertures located proximate to the first coupling end, each of said lateral circular apertures passing through the outer surface of the first receptacle and providing access into the substantially hollow interior space of the first receptacle, each of said lateral circular apertures having substantially similar diameters and being oriented on opposite sides of the first receptacle from each other,
the first anchor member is a substantially cylindrical rod having an outside diameter just slightly smaller than the diameter of each lateral circular aperture of the first receptacle, a length greater than the distance between the pair of lateral circular apertures of the first receptacle, a first end, a second end, and a middle portion located between the first and second ends,
wherein the first anchor member is configured to be placed into and through the pair of lateral circular apertures of the first receptacle such that the first end of the first anchor member extends beyond the outer surface of the first receptacle, the second end of the first anchor member extends beyond the outer surface of the first receptacle, the middle portion of the first anchor member is located within the substantially hollow interior space of the first receptacle, and the first anchor member is oriented substantially perpendicular to a longitudinal axis of the first receptacle, and
the coupling member is configured such that a portion of the coupling member is inserted through the coupling end aperture at the first coupling end of the first receptacle and into the substantially hollow interior space of the first receptacle, wherein the coupling member is placed in connection with the middle portion of the first anchor member.

4. The coupler of claim 3 wherein
the first end of the first anchor member comprises a first removable retaining device, such that when the first removable retaining device is removed from the first end of the first anchor member the first end of the first anchor member passes through both of the lateral circular apertures of the first receptacle, and when the first removable retaining device is engaged with the first end of the first anchor member the first end of the first anchor member cannot pass through either of the lateral circular apertures of the first receptacle, and the second end of the first anchor member comprises a stop member, wherein said stop member has a dimension larger than each of the diameters of the lateral circular apertures of the first receptacle such that the second end of the first anchor member cannot pass through either of the lateral circular apertures of the first receptacle.

5. The coupler of claim 4 wherein the first removable retaining device is a cotter pin configured to be inserted into an aperture formed through the first end of the first anchor member.

6. The coupler of claim 4 wherein the first removable retaining device is a threaded nut configured to be inserted onto threads formed onto the first end of the first anchor member.

7. The coupler of claim 3 wherein the first end of the first anchor member comprises a hinged retaining device, said hinged retaining device capable of being aligned substantially along a longitudinal axis of the first anchor member and being capable of being aligned substantially perpendicular to the longitudinal axis of the first anchor member, such that when the hinged retaining device is aligned substantially along the longitudinal axis of the first anchor member the first end of the first anchor member passes through both of the lateral circular apertures of the first receptacle, and when the hinged retaining device is aligned substantially perpendicular to the longitudinal axis of the first anchor member the first end of the first anchor member cannot pass through either of the lateral circular apertures of the first receptacle, and the second end of the first anchor member comprises a stop member, wherein said stop member has a dimension larger than each of the diameters of the lateral circular apertures of the first receptacle such that the second end of the first anchor member cannot pass through either of the lateral circular apertures of the first receptacle.

8. The coupler of claim 3 wherein the coupling member is configured as a closed ring.

9. The coupler of claim 3 wherein the coupling member is configured as an opened ring.

10. The coupler of claim 3 wherein the coupling member has a first end and a second end, with the first end configured to engage the first anchor member of the first receptacle and the second end configured to engage the second anchor member of the second receptacle, with the first end of the coupling member being configured as a closed ring.

11. The coupler of claim 3 wherein the coupling member has a first end and a second end, with the first end configured to engage the first anchor member of the first receptacle and the second end configured to engage the second anchor member of the second receptacle, with the first end of the coupling member being configured as an opened ring.

12. The coupler of claim 1 further comprising a conductive collar, said conductive collar having a first end and a second end, with the first end of the conductive collar engages with the outer surface of the first receptacle proximate to the first coupling end of the first receptacle, and the second end of the conductive collar engages with the outer surface of the second receptacle proximate to the second coupling end of the second receptacle;

wherein said conductive collar is electrically conductive, the first receptacle is electrically conductive, the first wire retaining member is electrically conductive, the second receptacle is electrically conductive, and the second wire retaining member is electrically conductive.

13. The coupler of claim 12 wherein the first receptacle is substantially cylindrical, having a first outer diameter located proximate to its first coupling end, the second receptacle is substantially cylindrical, having a second outer diameter located proximate to its second coupling end, and the conductive collar is substantially cylindrical, having a first inside diameter proximate to its first end, said first inside diameter substantially the same as the first outer diameter of the first receptacle, a second inside diameter proximate to its second end, said second inside diameter substantially the same as the second outer diameter of the second receptacle, a first opening at its first end, a second opening at its second end, and a substantially hollow interior space, wherein the first coupling end of the first receptacle is positioned within the substantially hollow interior space of the conductive collar, and the second coupling end of the second receptacle is positioned within the substantially hollow interior space of the conductive collar.

14. The coupler of claim 13 wherein the conductive collar has a longitudinal slot running from the first end of the conductive collar to the second end of the conductive collar, oriented substantially parallel with a longitudinal axis of the conductive collar, the conductive collar has a first flange, said first flange being substantially planar and extending outward from a first side of the longitudinal slot of the conductive collar, the conductive collar has a second flange, said second flange being substantially planar and extending outward from a second side of the longitudinal slot of the conductive collar, with the second flange oriented substantially parallel to and in contact with the first flange, and the conductive collar has one or more securing members, said one or more securing members configured to secure the first flange to the second flange.

15. The coupler of claim 14 wherein the first flange of the conductive collar has one or more flange apertures, the number of flange apertures being the same as the number of the one or more securing members, the second flange of the conductive collar has one or more flange apertures, the number of flange apertures being the same as the number of the one or more securing members, each said flange aperture of the second flange of the conductive collar being substantially aligned with a corresponding flange aperture of the first flange of the conductive collar, and each of the one or more securing members comprises a threaded bolt and a threaded nut, with each bolt of each said securing member configured to pass through a flange aperture of the first flange of the conductive collar and a corresponding flange aperture of the second flange of the conductive collar and to be secured by a corresponding threaded nut being threaded onto said threaded bolt.

16. The coupler of claim 13 wherein
the first anchor member is electrically conductive,
the second anchor member is electrically conductive, and
the coupling member is electrically conductive.

17. The coupler of claim 1 wherein
the first receptacle is substantially cylindrical, having a coupling end aperture at its first coupling end allowing access into the substantially hollow interior space of the first receptacle, said coupling end aperture having an inside diameter,
the first anchor member is a substantially cylindrical rod having a first end, a second end, and a middle portion located between the first and second ends, and a length substantially the same as the inside diameter of the coupling end aperture of the first receptacle, and
wherein the first anchor member is located within the substantially hollow interior space of the first receptacle proximate to the first coupling end of the first receptacle, with the first end of the first anchor member fixedly attached to an inside surface of the first receptacle and the second end of the first anchor member fixedly attached to the inside surface of the first receptacle,
wherein a portion of the coupling member is configured to be inserted through the coupling end aperture at the first coupling end of the first receptacle and into the substantially hollow interior space of the first receptacle and placed in connection with the middle portion of the first anchor member.

18. The coupler of claim 17 wherein
the coupling member has a first end and a second end, with the first end configured to engage the first anchor member of the first receptacle and the second end configured to engage the second anchor member of the second receptacle,
whereby the first end of the coupling member is configured to be an opened ring adapted to being placed onto the middle portion of the first anchor member.

19. The coupler of claim 1 wherein
the first receptacle is substantially cylindrical, with a taper at its first wire retaining end, such that the first wire retaining aperture has an inner diameter and the first receptacle has an inner diameter located between the taper and the first coupling end,
whereby the inner diameter of the first receptacle is greater than the inner diameter of the first wire retaining aperture.

20. The coupler of claim 19 wherein
the first wire retaining member has an outside diameter which is greater than the inner diameter of the first wire retaining aperture and smaller than the inner diameter of the first receptacle, such that the first wire retaining member cannot pass through the first wire retaining aperture of the first receptacle, the first wire retaining member can move freely within the substantially hollow interior space of the first receptacle outside of the taper, and the first wire retaining member becomes wedged into the tapered end of the first receptacle as it is moved therein,
the first wire retaining member is comprised of a pair of mated jaws and a biasing spring, and
the first receptacle further comprises an inside planar surface, said inside planar surface located within the substantially hollow interior space of the first receptacle between the first wire retaining end of the first receptacle and the first coupling end of the first receptacle, said inside planar surface being oriented substantially perpendicular to a longitudinal axis of the first receptacle,
with each jaw of the first wire retaining member having an inner surface and a substantially semi-cylindrical concave channel inscribed within said inner surface, such that when the pair of jaws are mated the respective inner surfaces face each other and the channels define a substantially cylindrical passageway through the first wire retaining member, with said passageway configured to contain therein a portion of the insertion end of the first wire segment,
with said inner surfaces of the mated jaws of the first wire retaining member comprising a plurality of unidirectional gripping members which allow the portion of the insertion end of the first wire segment to move over said gripping members in the direction away from the first wire retaining end of the first receptacle but which impede movement of the portion of the insertion end of the first wire segment toward the first wire retaining end of the first receptacle, and
the biasing spring of the first wire retaining member is located within the substantially hollow interior space of the first receptacle between the inside planar surface of the first receptacle and the first wire retaining aperture of the first receptacle, with the mated jaws of the first wire retaining member located between the biasing spring and the first wire retaining aperture of the first receptacle,
wherein the biasing spring of the first wire retaining member is biased to move the mated jaws of the first wire retaining member towards the first wire retaining end of the first receptacle,
whereby upon insertion of a portion of the insertion end of the first wire segment into the first wire retaining end of the first receptacle, the insertion end of the first wire segment forces apart the mated jaws of the first wire retaining member and passes between the mated jaws, with the biasing spring then moving the mated jaws towards the first wire retaining end of the first receptacle where the mated jaws become wedged, thereby securing the portion of the insertion end of the first wire segment to the first receptacle.

* * * * *